April 15, 1924.
J. N. DERSCHUG
1,490,890
CASTER ATTACHMENT
Original Filed Jan. 31, 1920
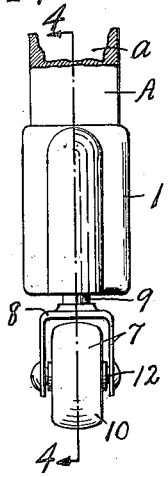
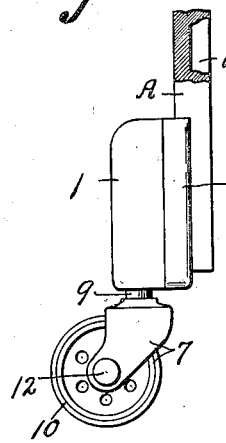
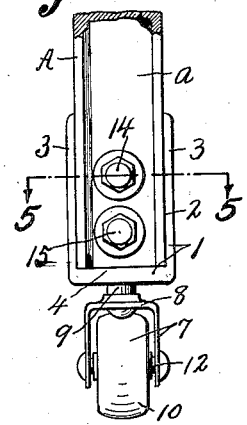
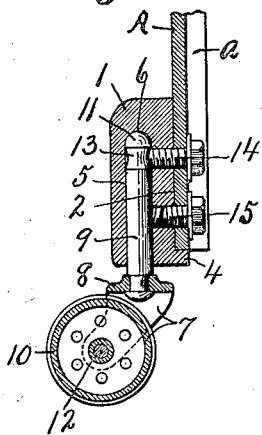
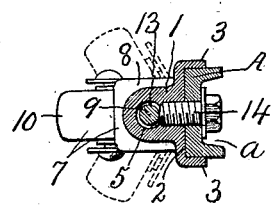
Inventor
John N. Derschug.
By Howard V. Denison
Attorney.

Patented Apr. 15, 1924.

1,490,890

UNITED STATES PATENT OFFICE.

JOHN N. DERSCHUG, OF SYRACUSE, NEW YORK, ASSIGNOR TO SYRACUSE WASHING MACHINE CORPORATION, OF SYRACUSE, NEW YORK.

CASTER ATTACHMENT.

Original application filed January 31, 1920, Serial No. 355,515. Divided and this application filed July 24, 1922. Serial No. 577,157.

*To all whom it may concern:*

Be it known that I, JOHN N. DERSCHUG, of Syracuse, in the county of Onondaga, in the State of New York, have invented new and useful Improvements in Caster Attachments, of which the following, taken in connection with the accompanying drawings, is a full, clear, and exact description.

This invention relates to a caster attachment as shown in my pending application, Serial No. 355,515, filed January 31, 1920, clothes washing machines, of which the present application is a division.

Large numbers of machines of this character, and other apparatus, of more or less heavy superstructure are usually supported upon three or more legs having casters to enable the machine or apparatus to be moved along the floor from place to place, and while I am aware that it has long been a common practice to provide means whereby the casters may be mounted upon the legs in such manner as to swing about a vertical axis when rolling the machine along the floor in different directions, I have been unable to find any caster of the roller-swivel type suitable to the peculiar needs of clothes washing machines, of the class referred to,— that is, one in which the bracket by which the caster is coupled to the leg may serve the double purpose of allowing the caster to be swivelled therein to turn freely about a vertical axis, without liability of displacement in case the machine is lifted from the floor, and also to serve as a foot for supporting the legs directly upon the floor when it is desired to omit the caster and allow the machine to be used as a stationary fixture.

The main object of my invention, therefore, is to provide a light, strong and durable caster attachment which may be easily and quickly attached to the leg of the machine, to form a direct support therefor, and in which the caster may be swivelled to turn about a vertical axis without liability of displacement therefrom, when the machine with the casters thereon is lifted from the floor.

Other objects and uses relating to specific parts of the device will be brought out in the following description.

In the drawings:

Figures 1, 2 and 3 are respectively a front elevation, a side elevation and a rear elevation of my improved caster attachment with the caster thereon, showing the adjacent portions of one of the legs of an apparatus such as a clothes washing machine, mounted on the attachment.

Figures 4 and 5 are respectively a vertical sectional view and a horizontal sectional view taken respectively on line 4—4, Figure 1, and line 5—5, Figure 3.

As illustrated, the caster attachment forming the subject matter of my invention, is adapted to be used in connection with a straight, vertical leg —A—, of channeled steel, in which the channel —a— faces inwardly, or toward the center of the machine, particularly when used in connection with a clothes washing machine shown in my pending application referred to, and consists of a cast metal bracket —1—, having a channel —2—, extending downwardly from its upper end but terminating a short distance above the lower end, to form opposite, upright flanges —3—, and a horizontal ledge or flange —4— for engaging respectively the opposite upright sides and lower end of the leg —a—.

That is, the lower end of the leg —A— is seated in the channel —2—, so that the upright flanges —3— serve to hold the bracket —1— and leg —A— against relative lateral movement, while the horizontal flange —4— serves to support the leg and its share of the weight of the structure, which may be mounted upon the upper portion of the leg.

This bracket —1— is also provided with a vertical, elongated socket —5—, extending upwardly from the lower end thereof, and terminating a short distance below the upper end so that the top wall of the socket may form a spherical end thrust bearing —6— for the caster, as —7—, said socket being parallel with the channel —2—, between said channel and the outer face of the bracket —1—, so as to leave ample stock entirely around the socket to assure strength and rigidity.

The caster —7— consists of a U-shaped yoke —8—, having an upwardly extending spindle —9—, rigidly secured to the crossbar of the yoke, and journaled in the socket —5—, the arms of the yoke —8—, being extended downwardly and laterally from the spindle —9—, to receive and support between them a roller —10—.

The spindle —9— is cylindrical and of uniform diameter throughout the greater portion of its length, and has its upper end provided with a spherical portion —11—, adapted to engage the spherical end thrust bearing —6—, the lower end of said spindle being extended a short distance below the lower end of the bracket —1— and rigidly secured to the cross-bar of the yoke —8— to turn with the socket —5— without in any way interferring with the free rotary movement of the roller —10—, which is journaled in the opposite arms of the yoke, by means of a spindle —12—.

The intermediate portion of the spindle —9—, preferably near the upper end thereof, is provided with an annular groove —13—, for receiving the inner end of the detent screw —14—, which is engaged in registering, threaded apertures in the adjacent portions of the leg —A— and bracket —1—, and serves the double purpose of clamping the bracket to the leg and also retaining the spindle —9— in the socket —5— against downward displacement in case the leg with the caster thereon should be lifted from the floor, without in any way interfering with the free rotation of the spindle —9— in the socket —5—.

An additional clamping screw —15— is engaged in registering threaded apertures in the adjacent portions of the leg —A— and bracket —1—, preferably between the clamping bolt —14— and horizontal flange —4—, but as shown more clearly in Figure —4—, this clamping screw —15— is somewhat shorter than the bolt —14—, to prevent its engagement with the spindle —9— when firmly tightened, so as not to interfere with the free rotation of said spindle in the socket —5—.

It is evident from the foregoing description that the load of the superstructure upon the legs —A— is borne directly by the ledges, or horizontal flanges —4— of the bracket —1—, and is then transmitted through the end thrust bearing —6— directly to the spindle of the caster —7—, which in turn is supported upon the floor, while the lateral strains between the leg and bracket are transmitted to the side flanges —3—, all of which reduces to a minimum, shearing strains upon the clamping bolts —14— and —15—, and assures sturdy, rigid and reliable connections between the casters and legs.

Furthermore, by attaching the caster in the manner described, through the medium of the bolts —14— and —15—, if it should be desired to remove the casters, and to support the machine directly upon the floor as a permanent fixture, it is simply necessary to loosen the screw —14— sufficiently to disengage it from the groove —13—, thus permitting the caster to be drawn downwardly from the bracket —1—, whereupon the bolt —14— may be retightened to assist the bolt —15— in securing a rigid connection between the bracket and leg, and, after the casters have been removed, the lower faces of the brackets —1— may rest directly upon the floor.

What I claim is:

A caster attachment for channel-iron legs comprising an upright bracket having a lengthwise channel in one side open at the top and closed at the bottom for receiving and supporting the leg, said bracket having a lengthwise socket open at the bottom and closed at the top, the channeled portion of the bracket being extended upwardly beyond the closed end of the socket, a caster having a spindle journaled in the socket and against the closed top thereof and provided with an annular groove, and clamping bolts engaged in threaded openings in the bracket one above the other and radial to said socket for clamping the leg in the channel of the bracket, one of said bolts being extended into the annular groove of the spindle.

In witness whereof I have hereunto set my hand this 17th day of July, 1922.

JOHN N. DERSCHUG.

Witnesses:
H. E. CHASE,
HOWARD P. DENISON.